United States Patent
Tan

(10) Patent No.: US 11,262,788 B2
(45) Date of Patent: Mar. 1, 2022

(54) METHOD AND SYSTEM FOR REALIZING SYNCHRONOUS DISPLAY OF LED LIGHT STRINGS BASED ON HIGH-PRECISION CLOCK SIGNAL

(71) Applicant: JIANGMEN PENGJIANG TIANLI NEW TECH CO., LTD., Jiangmen (CN)

(72) Inventor: Yanying Tan, Jiangmen (CN)

(73) Assignee: JIANGMEN PENGJIANG TIANLI NEW TECH CO., LTD., Jiangmen (CN)

(\*) Notice: Subject to any disclaimer, the term of this patent is extended or adjusted under 35 U.S.C. 154(b) by 0 days.

(21) Appl. No.: 16/896,255

(22) Filed: Jun. 9, 2020

(65) Prior Publication Data

US 2021/0181784 A1    Jun. 17, 2021

Related U.S. Application Data

(63) Continuation-in-part of application No. PCT/CN2020/086905, filed on Apr. 26, 2020.

(30) Foreign Application Priority Data

Dec. 13, 2019 (CN) .......................... 201911285022.6

(51) Int. Cl.
*G06F 1/12* (2006.01)
*G06F 1/10* (2006.01)
*H05B 45/00* (2020.01)
*G06F 13/42* (2006.01)
*G06F 1/14* (2006.01)
*H05B 45/60* (2022.01)

(52) U.S. Cl.
CPC .................. *G06F 1/12* (2013.01); *G06F 1/10* (2013.01); *G06F 1/14* (2013.01); *G06F 13/4282* (2013.01); *H05B 45/60* (2020.01)

(58) Field of Classification Search
CPC ........................... G06F 1/04–14; H05B 45/60
See application file for complete search history.

(56) References Cited

U.S. PATENT DOCUMENTS

| 7,394,210 | B2 * | 7/2008 | Ashdown | ............... H05B 45/00 315/291 |
| 9,374,875 | B2 * | 6/2016 | Ben-Moshe | .............. G01S 1/68 |
| 9,743,473 | B2 * | 8/2017 | Weaver | ................... H05B 45/48 |
| 2012/0026019 | A1 * | 2/2012 | Lin | ...................... H05B 45/305 341/50 |

(Continued)

*Primary Examiner* — Brian T Misiura

(57) ABSTRACT

A method and system for realizing synchronous display of LED light strings based on a high-precision clock signal, which relates to the field of LED technology and specifically comprises the steps of: performing synchronization timing for a data processing module based on a high-precision clock signal to generate a standard clock; dividing the standard clock into several time periods, each time period circularly corresponding to a group of program data; and converting the program data into a suitable control signal by means of a data conversion module and outputting it to the LED light strings. The present invention enables LED light strings of different controllers to change synchronously, and the distances between the controllers are not limited, and the synchronization effect can be achieved whenever the power is turned on.

9 Claims, 2 Drawing Sheets

(56) References Cited

U.S. PATENT DOCUMENTS

| | | | | |
|---|---|---|---|---|
| 2012/0182209 A1* | 7/2012 | Tuikkanen | ............ | G09G 3/3648 345/99 |
| 2012/0299480 A1* | 11/2012 | Peting | .................. | H05B 47/185 315/113 |
| 2015/0091446 A1* | 4/2015 | Ohta | .................... | H05B 47/125 315/153 |
| 2015/0237706 A1* | 8/2015 | Ben-Moshe | .............. | G01S 1/68 315/294 |

* cited by examiner

METHOD AND SYSTEM FOR REALIZING SYNCHRONOUS DISPLAY OF LED LIGHT STRINGS BASED ON HIGH-PRECISION CLOCK SIGNAL

CROSS REFERENCE OF RELATED APPLICATIONS

The present application is a continuation-in-part of International Patent Application No. PCT/CN2020/086905 filed on Apr. 26, 2020, which claims foreign priorities of Chinese Patent Application No. 201911285022.6, filed on Dec. 13, 2019, the entire contents of which are hereby incorporated by reference.

TECHNICAL FIELD

The present invention relates to the field of LED control technology, and particularly to a method and system for realizing synchronous display of LED light strings based on a high-precision clock signal.

BACKGROUND ART

One method to realize synchronization of display changes of different LED light strings is to control synchronous display of the LED light strings by taking the AC signal frequency of the mains supply as the clock of a single chip microcomputer by powering on at the same time. For example, the Chinese utility model patent with a publication number CN 201075877 Y discloses a synchronization LED light string controller, which comprises: a clock synchronization circuit that receives a reference signal with a fixed frequency and generates a system clock according to the reference signal; a counting circuit that counts the system clock and generates a timing signal; a control logic circuit that receives the timing signal to generate a control signal; and a driving circuit that receives the control signal to drive at least a light emitting diode. However, the disadvantage of this method is that simultaneous powering on is necessary and the same AC power supply equipment is needed. The other method is to use a crystal oscillator as the clock of the single chip microcomputer and cooperate with a remote controller to control synchronous display of the LED light strings. The disadvantage of this method is that the crystal frequency has error, and the longer the time, the larger the error.

SUMMARY OF THE INVENTION

The present invention proposes a method and system for realizing synchronous display of LED light strings based on a high-precision clock signal, which solves the problem in the prior art that either simultaneous powering on is needed and the same AC power supply equipment is needed; or the crystal frequency has an error, and the longer the time, the larger the error.

The technical solution of the present invention is implemented as follows:

A method for realizing synchronous display of LED light strings based on a high-precision clock signal, specifically comprises the steps of:

S1, performing synchronization timing for a data processing module based on a high-precision clock signal to generate a standard clock;

S2, dividing the standard clock into several time periods, each time period circularly corresponding to a group of program data; and S3, converting the program data into a suitable control signal by means of a data conversion module and outputting it to the LED light strings.

As a preferred method for realizing synchronous display of LED light strings based on a high-precision clock signal in the present invention, the high-precision clock signal is a satellite clock signal.

As a preferred method for realizing synchronous display of LED light strings based on a high-precision clock signal in the present invention, the high-precision clock signal is a GPS clock signal, a Beidou satellite clock signal, a GLONASS clock signal, or a Beidou clock signal.

As a preferred method for realizing synchronous display of LED light strings based on a high-precision clock signal in the present invention, said performing synchronization timing for a data processing module based on a high-precision clock signal in step 1 specifically refers to that a high-precision clock signal receiving module outputs serial port time information in the received satellite signal to the data processing module, and the data processing module obtains the time information format that conforms to the regulations, to generate a standard clock, and complete the synchronization timing service.

As a preferred method for realizing synchronous display of LED light strings based on a high-precision clock signal in the present invention, an LED light string control signal output by the data conversion module is a control signal of DMX512 protocol.

A system for realizing synchronous display of LED light strings based on a high-precision clock signal comprises a high-precision clock signal receiving module, a data processing module, and a data conversion module; wherein the high-precision clock signal receiving module is configured to perform synchronization timing for the data processing module based on a high-precision clock signal to generate a standard clock;

the data processing module is configured to divide the standard clock into several time periods, each time period circularly corresponding to a group of program data; and the data conversion module is configured to convert the program data into a suitable control signal and output it to the LED light strings.

As a preferred system for realizing synchronous display of LED light strings based on a high-precision clock signal in the present invention, the high-precision clock signal receiving module is a GPS signal receiving module, a Beidou satellite signal receiving module, or a GLONASS signal receiving module.

As a preferred system for realizing synchronous display of LED light strings based on a high-precision clock signal in the present invention, the high-precision clock signal receiving module outputs serial port time information in a received satellite signal to the data processing module, and the data processing module obtains the time information format that conforms to the regulations, to generate a standard clock, and complete the synchronization timing service.

The beneficial effects of the present disclosure are as follows: synchronous change of LED light strings of different controllers can be realized, the distances between controllers are not limited, and the synchronization effect can be achieved whenever the power is turned on.

BRIEF DESCRIPTION OF THE DRAWINGS

In order to illustrate the technical solutions in the embodiments of the present invention or in the prior art more clearly, a brief introduction to the figures to be used in the description of the embodiments or the prior art will be provided below. Obviously, the drawings in the following description show merely some embodiments of the present invention, and those of ordinary skills in the art would have derived other drawings from these drawings without any creative effort.

In the figures, 1—high-precision clock signal receiving module; 2—data processing module; and 3—data conversion module.

DETAILED DESCRIPTION OF EMBODIMENTS

The technical solution in the embodiments of the present invention will be clearly and completely described below in conjunction with the accompanying drawings for the embodiments of the present invention; and obviously, the embodiments described are merely some, rather than all, of the embodiments of the present invention. On the basis of the embodiments of the present invention, all the other embodiments obtained by those of ordinary skill in the art without creative efforts shall fall within the scope of protection of the present invention.

In the description of the present invention, it should also be noted that the terms "setup", "installation", "connected", and "connection" should be understood in a broad sense, unless otherwise explicitly specified and limited. For example, the connection can be a fixed connection and can also be a detachable connection or integrated connection; can be a mechanical connection and can also be an electrical connection; and can be a direct connection and can also be an indirect connection through an intermediate medium, and can be communication between interiors of two elements. For those of ordinary skill in the art, the specific meaning of the terms mentioned above in the present invention should be construed according to specific circumstances.

Figure 1:
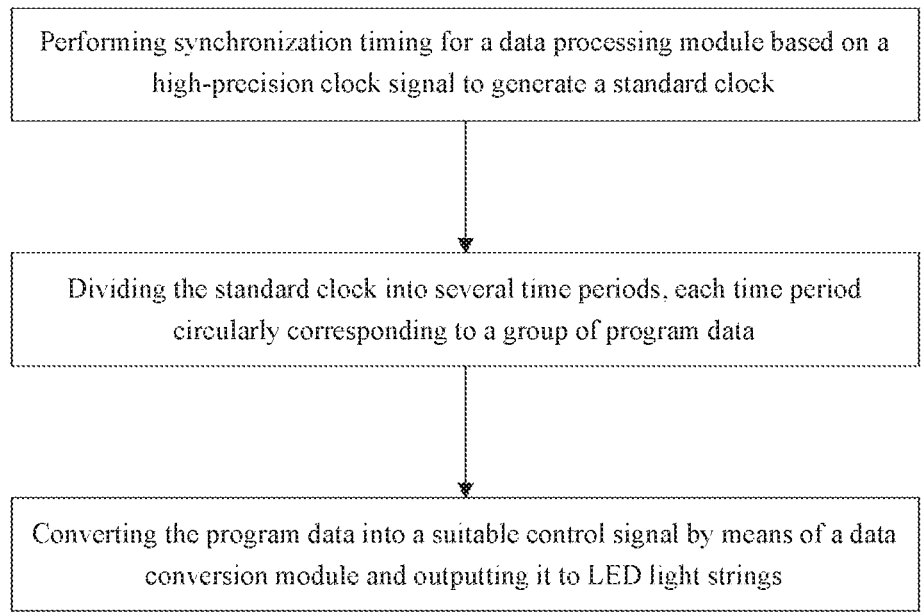
FIG. 1 is a flowchart of an embodiment of a method for synchronous display of LED light strings based on a high-precision clock signal according to the present invention.

As shown in FIG. 1, the present invention proposes a method for realizing synchronous display of LED light strings based on a high-precision clock signal, which specifically comprises the steps of:

S1, performing synchronization timing for a data processing module based on a high-precision clock signal to generate a standard clock;

S2, dividing the standard clock into several time periods, each time period circularly corresponding to a group of program data; and S3, converting an LED light string control data into a suitable control signal by means of a data conversion module and outputting it to the LED light strings.

As a preferred embodiment of the present invention, the high-precision clock signal is a satellite clock signal. Specifically, the high-precision clock signal is a GPS clock signal, or a Beidou satellite clock signal, or a GLONASS clock signal. In other embodiments, the high-precision clock signal may also be a high-precision clock signal generated by means of other methods.

Taking GPS clock signal as an example, GPS clock is a basic timing application product developed based on the latest GPS high-precision positioning timing module. A time information format that conforms to the protocol can be output according to user demands, thereby completing the synchronization timing service. The main principle is to receive serial port time information of GPS or other satellites through the receiving module and output it to the data processing module, and the data processing module obtains the time information format that conforms to the regulations and generates a standard clock. This is currently the most effective way of achieving nanosecond timing precision and frequency output stability in an order of 1E12.

The present invention mainly utilizes the standard clock signal acquired from GPS, and determines that it is divided into several time periods based on time, protocol data of the LED light strings being circulated in the corresponding time period.

The GPS standard clock is divided into several time periods, including time period 1, time period 2, . . . time period N, based on time by the single chip microcomputer, where N is a positive integer.

The time period 1 is preset to correspond to program data 1, the time period 2 is preset to correspond to program data 2, . . . the time period N is preset to correspond to program data N, and the program data is circulated in respective time period.

After the program data is output to the data conversion module, it is converted into a suitable control signal to control the change of the LED light.

Due to the high precision of the GPS clock signal, the processing method for realizing synchronous display of LED light strings based on the GPS clock, in combination with DMX512-1990 digital lighting protocol, enables compatibility of light string control to be more extensive. By using the controller made by this method, synchronous change of LED light strings of different controllers can be realized, the distances between controllers are not limited, and the synchronization effect can be achieved whenever the power is turned on.

The operation steps for the Beidou satellite clock signal, the GLONASS clock signal or the Beidou clock signal are the same as those for the GPS clock signal, and will not be described again.

As a preferred method for realizing synchronous display of LED light strings based on a high-precision clock signal in the present invention, the LED light string control signal is a control signal of DMX512 protocol. In other embodiments, other protocols than DMX512-1990 protocol can be output to control the LED light strings.

Figure 2:
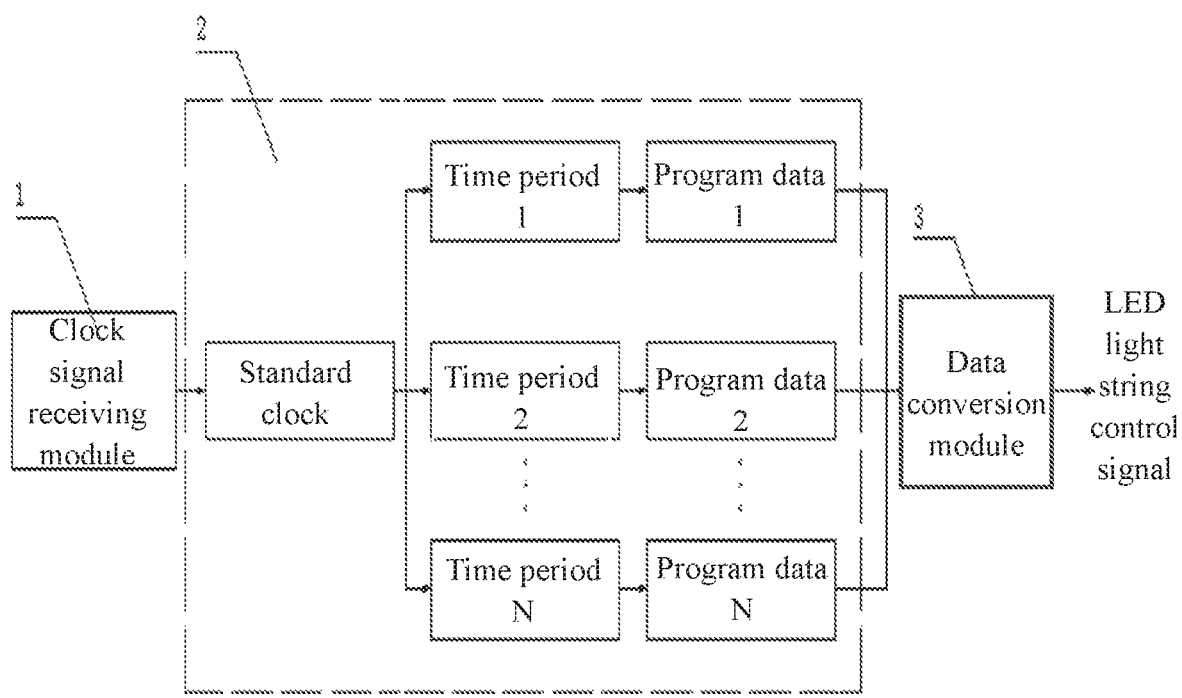
FIG. 2 is a principle block diagram of an embodiment of a system for synchronous display of LED light strings based on a high-precision clock signal according to the present invention.
Figure 3:
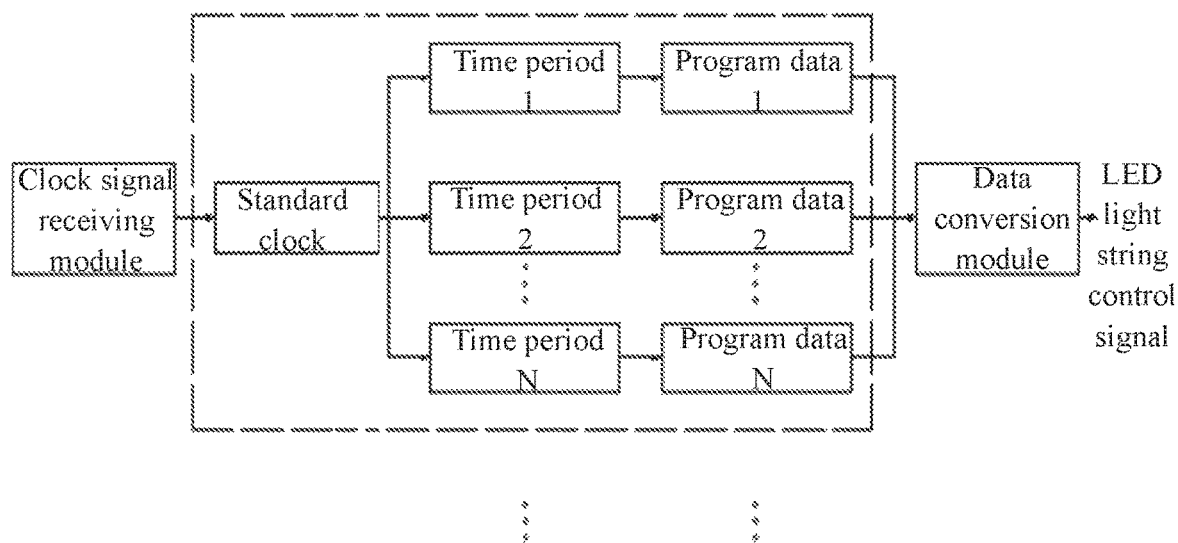
FIG. 3 is a principle block diagram of another embodiment of the system for synchronous display of LED light strings based on a high-precision clock signal according to the present invention.
Figure 3:
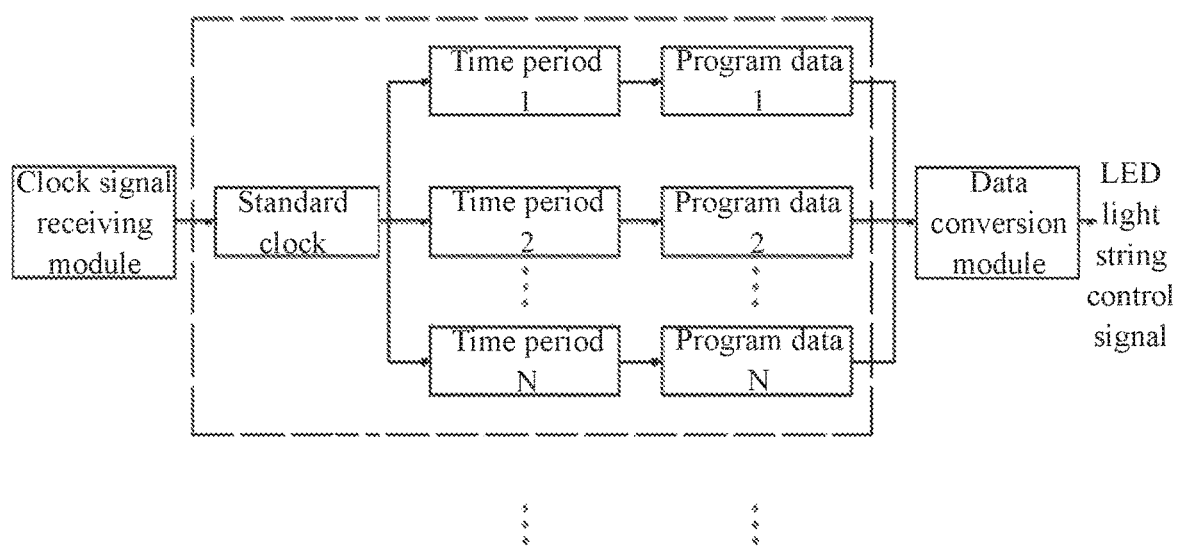
Figure 3:
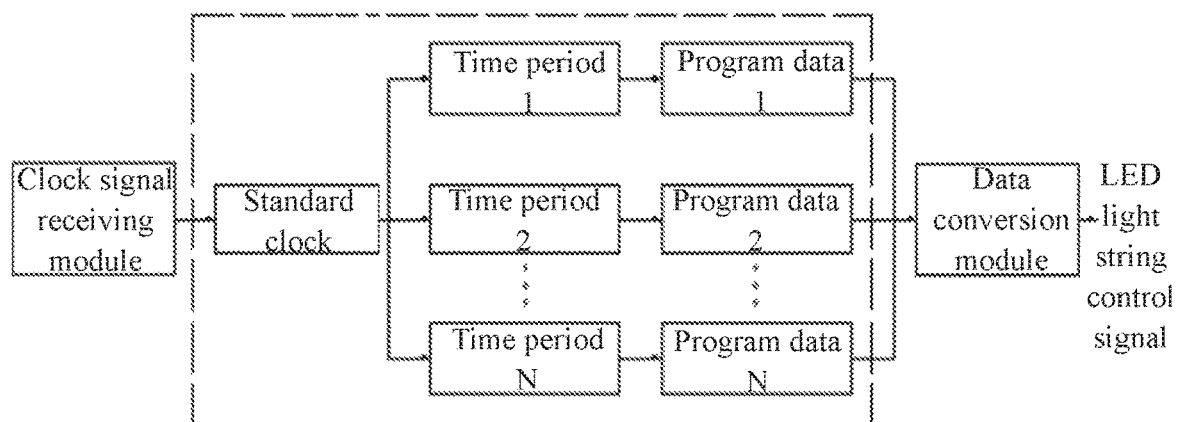

As shown in FIG. 2 and FIG. 3, the present invention proposes a system for realizing synchronous display of LED light strings based on a high-precision clock signal, which comprises a high-precision clock signal receiving module 1, a data processing module 2, and a data conversion module 3; wherein the high-precision clock signal receiving module 1 is configured to perform synchronization timing for the data processing module 2 based on a high-precision clock signal to generate a standard clock;

the data processing module 2 is configured to divide the standard clock into several time periods, each time period circularly corresponding to a group of program data; and the data conversion module 3 is configured to convert the program data into a suitable control signal and output it to the LED light string.

As a preferred embodiment of the present invention, the high-precision clock signal receiving module 1 is a GPS signal receiving module, a Beidou satellite signal receiving module, or a GLONASS signal receiving module. Specifically, the high-precision clock signal receiving module 1 outputs serial port time information in a received satellite signal to the data processing module 2, and the data processing module outputs the time information format that conforms to the regulations, to generate a standard clock, and complete the synchronization timing service. The high-precision clock signal receiving module 1 may also be a module that generates/receives a high-precision clock signal by means of other methods.

Taking the GPS clock signal as an example, a high-precision clock signal acquisition module acquires the standard clock signal from the GPS clock signal, and determines that it is divided into several time periods based on time, the program data being circulated in corresponding time period.

The GPS standard clock is divided into several time periods, including time period 1, time period 2, . . . time period N, based on time by the data processing module, where N is a positive integer.

The time period 1 is preset to correspond to program data 1, the time period 2 is preset to correspond to program data 2, . . . the time period N is preset to correspond to program data N, and the program data is circulated in respective time period.

The data processing module 2 outputs the program data to the data conversion module 3, which is converted into a suitable control signal to control the change of the LED light.

The system in the present invention may comprise at least a group of high-precision clock signal receiving modules 1, data processing modules 2, and data conversion modules 3. The high-precision clock signal receiving modules 1 receive the same high-precision clock signal to ensure consistency, and all data processing modules 2 are burned with the same clock division algorithm to further ensure synchronous display. The program data is circulated in each time period to prevent non-synchronization caused by different execution times of program data of different groups.

The present invention can also be used for distributed LED display screens. Several LED display screens are located far away and need to synchronously display the same picture. A GPS signal receiving system can be added to the LED display screen to achieve the function of signal synchronization.

The present invention can also be used to upgrade the existing LED display device to integrate the time period division program of the data processing module 2 into the high-precision clock signal receiving module 1, and the high-precision clock signal receiving module 1 transmits the divided time period signal to the LED display device. The LED display device performs one-to-one correspondence between LED control signals and the time periods, and outputs control commands to the data conversion module 3 based on the time periods, or the high-precision clock signal receiving module 1 outputs control signals to the LED display device based on the time periods and the LED display device circularly outputs the same control command before receiving the next control signal. The present invention can realize synchronous change of LED light strings of different data processing modules 2, and the distances between the data processing modules 2 are not limited, and the synchronization effect can be achieved whenever the power is turned on.

The above embodiments are merely preferred embodiments of the present invention but not intended to limit the present invention, and any modifications, equivalent replacements, improvements, etc. made within the spirit and principle of the present invention should be included within the scope of protection of the present invention.

The invention claimed is:

1. A method for realizing synchronous display of LED light strings based on a high-precision clock signal, characterized by specifically comprising the steps of:
    S1, performing synchronization timing for a data processing module of each of the LED light strings based on a high-precision clock signal to generate a standard clock;
    S2, dividing the standard clock into several time periods by the data processing module of each of the LED light strings, each time period circularly corresponding to a group of program data; and
    S3, converting the program data into an LED light string control signal by means of a data conversion module of each of the LED light strings and outputting it to each of the LED light strings;
    wherein the LED light string control signals control the LED light strings to synchronously display.

2. The method for realizing synchronous display of LED light strings based on a high-precision clock signal according to claim 1, characterized in that the high-precision clock signal is a satellite clock signal.

3. The method for realizing synchronous display of LED light strings based on a high-precision clock signal according to claim 2, characterized in that the high-precision clock signal is a GPS clock signal, or a Beidou satellite clock signal, or a GLONASS clock signal.

4. The method for realizing synchronous display of LED light strings based on a high-precision clock signal according to claim 1, characterized in that said performing synchronization timing for the data processing module of each of the LED light strings based on the high-precision clock signal in step 1 refers to that a high-precision clock signal receiving module of each of the LED light strings outputs serial port time information in a received satellite signal to the data processing module of each of the LED light strings, and the data processing module of each of the LED light strings obtains a time information format to generate a standard clock, and complete the synchronization timing.

5. The method for realizing synchronous display of LED light strings based on a high-precision clock signal according to claim 1, characterized in that the LED light string control signal output by the data conversion module is a control signal of DMX512 protocol.

6. A system for realizing synchronous display of LED light strings based on a high-precision clock signal, comprising high-precision clock signal receiving modules, data processing modules, and data conversion modules
    each of the high-precision clock signal receiving modules is configured to perform synchronization timing for the data processing module based on a high-precision clock signal to generate a standard clock;
    each of the data processing modules of each LED light string is configured to divide the standard clock into several time periods, each time period circularly corresponding to a group of program data; and
    each of the data conversion modules is configured to convert the program data into an LED light string control signal and output it to each of the LED light strings;

wherein the LED light string control signals control the LED light strings to synchronously display.

7. The system for realizing synchronous display of LED light strings based on a high-precision clock signal according to claim 6, characterized in that the high-precision clock signal receiving module is a GPS signal receiving module, a Beidou satellite signal receiving module, or a GLONASS signal receiving module.

8. The system for realizing synchronous display of LED light strings based on a high-precision clock signal according to claim 6, characterized in that the high-precision clock signal receiving module outputs serial port time information in a received satellite signal to the data processing module, and the data processing module obtains a time information format, to generate a standard clock, and complete the synchronization timing.

9. The system for realizing synchronous display of LED light strings based on a high-precision clock signal according to claim 7, characterized in that each of the high-precision clock signal receiving modules outputs serial port time information in a received satellite signal to each of the data processing modules, and each of the data processing modules obtains a time information format, to generate a standard clock, and complete the synchronization timing.

* * * * *